(12) United States Patent
Yamane

(10) Patent No.: US 6,451,872 B1
(45) Date of Patent: Sep. 17, 2002

(54) NON-ASBESTOS FRICTION MATERIALS

(75) Inventor: Takeshi Yamane, Gunma-ken (JP)

(73) Assignees: Nisshinbo Industries, Inc., Tokyo (JP); BBA Friction GmbH, Leverkusen (DE)

(*) Notice: Subject to any disclaimer, the term of this patent is extended or adjusted under 35 U.S.C. 154(b) by 60 days.

(21) Appl. No.: 09/628,551

(22) Filed: Jul. 28, 2000

(30) Foreign Application Priority Data

Jul. 30, 1999 (JP) ............................................ 11-216258

(51) Int. Cl.$^7$ .................................................. C08J 5/14
(52) U.S. Cl. .................... 523/156; 523/156; 260/998.13
(58) Field of Search ................................ 523/149, 150, 523/152, 155, 156, 157, 158

(56) References Cited

U.S. PATENT DOCUMENTS 6,080,230 A * 6/2000 Sasaki et al. .................. 106/36
6,316,083 B1 * 11/2001 Kawabata et al. ........... 428/212

FOREIGN PATENT DOCUMENTS

EP 1081406 A2 * 3/2001

* cited by examiner

*Primary Examiner*—Edward J. Cain
*Assistant Examiner*—Katarzyna W. Lee
(74) *Attorney, Agent, or Firm*—Birch, Stewart, Kolasch & Birch, LLP

(57) ABSTRACT

A non-asbestos friction material is comprised of a molded and cured composition which includes a fibrous base, a binder, a filler, and particles of a rubber composite composed primarily of at least one fibrous substance and rubber, or of at least one fibrous substance, at least one type of hard particle and rubber. The rubber composite particles enable the fibrous substance to be uniformly dispersed and mixed without forming clumps and without segregation of the hard fibrous substance and the hard particles in the finished article. The qualities of each constituent can thus be used to full advantage to give friction materials such as automotive disk pads which have an excellent friction performance.

19 Claims, No Drawings

NON-ASBESTOS FRICTION MATERIALS

BACKGROUND OF THE INVENTION

1. Field of the Invention

The present invention relates to non-asbestos friction materials of excellent performance which can be used for braking in automobiles, large trucks, railroad cars and various types of industrial equipment.

2. Prior Art

Friction materials used for braking in automobiles, large trucks, railroad cars and various industrial equipment are desired to have a number of performance features. These features include excellent wear resistance, a friction coefficient that is both high and stable, outstanding resistance to brake fade, no generation of undesirable noises such as squeal during brake operation, and minimal attack of the rotor serving as the counter surface.

The friction material in such cases is generally fabricated by mixing together primarily a fibrous base, a binder and a filler, subjecting the mixed composition to preforming, thermoforming (pressing) and, if necessary, postcuring by heat treatment, then painting, baking and polishing to give a finished article. Mixture of the starting materials may be carried out by dry mixing or by wet mixing using a solvent or water.

However, during mixture of the starting materials, the fibrous substance tends to form clumps (masses of starting material), which discourages uniform dispersion. Also, because hard particles and hard fibrous substances are highly abrasive, inadequate mixture resulting in non-uniform distribution, or segregation, within the friction material leads to a poor friction performance (e.g., noise performance, fading resistance, wear resistance, resistance to counter surface attack, vibration during high-speed braking).

SUMMARY OF THE INVENTION

Therefore, one object of the invention is to provide a non-asbestos friction material of outstanding friction performance within which a fibrous substance and hard particles can be uniformly mixed and dispersed so as to enable the capabilities of these friction material constituents to be used to their fullest advantage.

The inventor has learned that by incorporating within a friction material composition particles of a rubber composite composed primarily of either rubber and a fibrous substance or of rubber, a fibrous substance and hard particles, the fibrous substance or the fibrous substance and the hard particles can be blended in a uniformly dispersed state within the friction material, enabling the friction material to exhibit an excellent friction performance.

That is, the inventor has found that the incorporation of rubber composite particles composed primarily of at least one fibrous substance and rubber, or the incorporation of rubber composite particles composed primarily of at least one fibrous substance, at least one type of hard particle and rubber, within a non-asbestos friction material comprised of a molded and cured composition that includes a fibrous base, a binder and a filler allows the uniform mixture and dispersion within the friction material of the fibrous substance or the fibrous substance and the hard particles so that these interlock well with the other constituents to form a non-asbestos friction material in which the capabilities of each constituent are used to fullest advantage. As a result, there can be obtained high-quality non-asbestos friction materials in which counter surface (rotor) attack and the amount of wear due to segregation of the hard particles and hard fibrous substance within the friction material are reduced, noise performance is improved, a decline in the friction coefficient at high temperatures is reliably prevented, and tearing and loss of rubber during brake operation are minimized.

In the non-asbestos friction materials to which the present invention is directed, incorporating particles of a rubber composite composed primarily of soft rubber, a fibrous substance and, according to one embodiment, hard particles within a non-asbestos friction material composition substantially eliminates the drawbacks described above because the fibrous substance, which tends to clump and disperses with difficulty, can be uniformly mixed and dispersed, and because segregation of the hard particles and the hard fibrous substance within the friction material, which causes high abrasiveness and ultimately leads to poor friction performance, such as noise and vibrations, can be prevented.

Also, the rubber within the friction material forms a transfer film on the counter surface (rotor), and so the friction performance is adversely affected by too much transfer or too much abrasion. Therefore, by including in the friction material of the invention particles of a rubber composite composed primarily of either rubber and a fibrous substance or of rubber, a fibrous substance and hard particles, a balance between rubber abrasion and film transfer is achieved. This balance discourages the loss of rubber composite particles from the friction material, leaves the rubber less susceptible to tearing even when subjected to shear forces during friction, and greatly reduces the amount of wear by the friction material. Moreover, loss of these rubber composite particles is less likely to occur even at high brake temperatures, making it possible to assure good performance by the friction material even when it is subjected to friction under high-temperature, high-load, high-speed conditions.

Thus, according to a first aspect of the invention, there is provided a non-asbestos friction material comprising a molded and cured composition that includes (A) a fibrous base, (B) a binder, (C) a filler, and (D) particles of a rubber composite composed primarily of at least one fibrous substance and rubber.

According to a second aspect of the invention, there is provided a non-asbestos friction material comprising a molded and cured composition that includes (A) a fibrous base, (B) a binder, (C) a filler, and (D) particles of a rubber composite composed primarily of at least one fibrous substance, at least one type of hard particle and rubber.

DETAILED DESCRIPTION OF THE INVENTION

The non-asbestos friction material of the invention is made by incorporating, in a composition of primarily a fibrous base, a binder and a filler, particles of a rubber composite composed primarily of at least one fibrous substance and rubber, or of at least one fibrous substance, at least one type of hard particle and rubber.

The rubber used in the rubber composite particles is not subject to any particular limitation. Exemplary rubbers include acrylonitrile-butadiene rubber (NBR), styrene-butadiene rubber (SBR), chlorobutyl rubber (CBR), silicone rubber, chloroprene rubber (CR), fluororubber (FR), isoprene rubber (IR), natural rubber (NR), butadiene rubber (BR), butyl rubber (IIR), acrylic rubber (AR), urethane rubber (UR), polysulfide rubber (such as that bearing the trade name designation Polysulfide TR), ethylene-propylene rubber (EPM), ethylene-propylene-diene rubber (EPDM)

and chlorosulfonated polyethylene (CSM, such as that bearing the trade name designation Hypalon). Any one or combinations of two or more thereof may be used. Of these, acrylonitrile-butadiene rubber (NBR), styrene-butadiene rubber (SBR), chlorobutyl rubber (CBR), silicone rubber, chloroprene rubber (CR) and fluororubber (FR) are preferred.

Use of the rubber in an uncrosslinked (unvulcanized) or semi-crosslinked (semi-vulcanized) state (including partially crosslinked or vulcanized rubber) is advantageous because rubber in this state mixes well with the other constituents such as the fibrous substance and the hard particles, and because crosslinkage (vulcanization) during molding and curing helps to enhance adhesion with the other constituents. In some cases, crosslinked (vulcanized) rubber can be used.

The fibrous substances referred to above include both fibers and fiber components. In the practice of the invention, such substances are divided into hard fibrous substances and soft fibrous substances. Generally, fibrous substances which have the ability to abrade the counter surface (rotor) are called "hard," while those which lack this ability and are instead themselves transferred are called "soft." Specifically, for the purposes of the present invention, hard fibrous substances are those having a Mohs hardness of preferably at least 4, more preferably at least 4.5, even more preferably at least 5, and most preferably from 5 to 10. Conversely, soft fibrous substances are those having a Mohs hardness of preferably less than 4, more preferably less than 3.5, even more preferably less than 3, and most preferably from 1 to 3.

The fiber length of the fibrous substance is not subject to any particular limitation, but is generally within a range of about 10 to 5,000 $\mu$m, and preferably about 100 to 3,000 $\mu$m. Too short a fiber length lowers the strength of the friction material, whereas too great a length increases the abrasiveness to an excessive degree, resulting in excessive wear of the counter surface. Preferably, the aspect ratio of the individual fibers (fiber length/fiber diameter) is within a range of about 10 to 2,000, and especially 10 to 1,000.

At least one type, and preferably 1 to 4 types, of fibrous substance is used in the practice of invention. More specifically, at least one type of hard fibrous substance or at least one type of soft fibrous substance may be used alone, although the use of at least one type of hard fibrous substance in combination with at least one type of soft fibrous substance is preferred.

Exemplary hard fibrous substances include (1) ceramic fibers, (2) natural mineral fibers, (3) glass fibers, and (4) metal fibers. Any one or combinations of two or more of these may be used. Illustrative examples of ceramic fibers include ceramic fibers composed primarily of alumina and silica, ceramic fibers composed primarily of alumina, silica and zirconia, and ceramic fibers composed primarily of silica, calcium oxide and magnesium oxide. Examples of these ceramic fibers that may be used include commercial products such as Ibiden (made by Ibiden Co., Ltd.), S-Fiber SC (made by Thermal Ceramics Division of Nippon Steel Chemical K.K.), Superwool 612 (made by Morgan Crucible) and Fiberflux (made by Toshiba Monoflux K.K.). Illustrative examples of natural mineral fibers include rock wool, wollastonite and sepiolite. Illustrative examples of metal fibers include fibers made of various types of metal, such as steel, stainless steel, bronze, copper and brass.

Exemplary soft fibrous substances include aramid fibers, carbon fibers, cellulose fibers, acrylic fibers and potassium titanate fibers. Any one or combinations of two or more of these may be used. Of these, aramid fibers such as Kevlar® made by E.I. du Pont de Nemours Co. and Twaron® made by Akzo Nobel are preferred.

The hard particles used in the invention may be any particles hard enough to abrade cast iron, although particles having a Mohs hardness of at least 4, preferably at least 4.5, more preferably at least 5, and most preferably from 5 to 10, are especially advantageous.

Exemplary hard particles of this type include ceramic particles, metal oxide particles and various types of nitride particles. Any one or combinations of two or more of these may be used.

Illustrative examples include silicon carbide, zirconium oxide, zirconium silicate, alumina, silica, magnesium oxide, iron oxide, titanium oxide, silicon nitride, zinc oxide, aluminum borate and titanium diboride. Of these, silicon carbide, zirconium oxide, zirconium silicate, alumina and silica are preferred.

The size of the hard particles varies according to such factors as the type, hardness and shape of the particles. In general, the particles are limited to a smaller size as the hardness becomes greater, whereas a lower hardness (greater softness) allows particles of a larger size to be used. A higher hardness (larger particle size) results in greater abrasiveness, which restricts the practical range of use of the friction material. Moreover, when the particles have a sharp, angular shape in the manner of broken fragments, for example, they tend to be more abrasive then when they are spherical or surface-treated.

The desired effects of the invention thus tend to become smaller as the hard particles of the invention, assuming the shape to be constant, have a lower Mohs hardness and a smaller size. For example, at a Mohs hardness of 9, it is preferable to use particles having a size of 0.1 to 10 $\mu$m, and especially 0.5 to 5 $\mu$m. At a Mohs hardness of 5, a particle size of 1 to 500 $\mu$m, and especially 5 to 200 $\mu$m, is preferred.

When the rubber composite particles in the invention are composed primarily of rubber and a fibrous substance, the amount of the rubber component is preferably 3 to 70% by weight, more preferably 5 to 50% by weight, and most preferably 5 to 35% by weight; and the amount of the fibrous substance is preferably 30 to 97% by weight, more preferably 50 to 95% by weight, and most preferably 65 to 95% by weight. The fibrous substance used in this case may be a hard fibrous substance, a soft fibrous substance, or a combination of both. When a combination of both a soft fibrous substance and a hard fibrous substance is used, any suitable mixing proportions may be selected. The hard fibrous substance accounts for preferably 30 to 97% by weight, and especially 50 to 95% by weight, of the fibrous substance as a whole. The soft fibrous substance accounts for preferably 3 to 70% by weight, and especially 5 to 50% by weight, of the fibrous substance as a whole.

When the rubber composite particles in the invention are composed primarily of rubber, a fibrous substance and hard particles, the amount of the rubber component is preferably 3 to 70% by weight, more preferably 5 to 50% by weight, and most preferably 5 to 35% by weight; the amount of the fibrous substance is preferably 3 to 96% by weight, more preferably 50 to 94% by weight, and most preferably 65 to 94% by weight; and the amount of hard particles is preferably 1 to 50% by weight, more preferably 1 to 30% by weight, and most preferably 1 to 20% by weight. The fibrous substance used in this case may be a hard fibrous substance, a soft fibrous substance, or a combination of both. When a combination of both a hard fibrous substance and a soft fibrous substance is used, any suitable mixing proportions may be selected. The hard fibrous substance accounts for preferably 30 to 97% by weight, and especially 50 to 95% by weight, of the fibrous substance as a whole. The soft fibrous substance accounts for preferably 3 to 70% by weight, and especially 5 to 50% by weight, of the fibrous substance as a whole.

In addition to the foregoing fibrous substance and hard particles, the rubber composite particles of the invention may have added thereto any suitable ingredients commonly used in friction materials. Illustrative examples include, without limitation, cashew dust, rubber powder, resins such as phenol resin, metal powders such as copper, zinc or aluminum, and also mica, vermiculite, graphite, coke, molybdenum disulfide, antimony trisulfide, antimony trioxide, phosphorus-based lubricants, barium sulfate and calcium hydroxide. Of these, the addition of a layered substance such as graphite, coke, mica or vermiculite is advantageous for enhancing the mixing properties.

The rubber composite particles of the invention are produced by first measuring out predetermined amounts of the above-described mixture of rubber and a fibrous substance (such as a combination of a hard fibrous substance and a soft fibrous substance) or mixture of rubber, a fibrous substance (such as a combination of a hard fibrous substance and a soft fibrous substance) and hard particles, and also predetermined amounts of optional materials, if necessary. These materials are loaded into a mixer, then mixed under an applied pressure. Preferably, the starting materials are divided into about two to ten portions and added to the mixer one portion at a time, although the entire amount of the raw materials may be added all at once. Preferable mixing conditions under applied pressure are 20 to 200° C. and 1 to 100 kg/cm$^2$ for 1 to 30 minutes, and especially 20 to 100° C. and 1 to 100 kg/cm$^2$ for 1 to 30 minutes.

Next, after mixing under applied pressure, it is advantageous for the pressure to be released to 20 kg/cm$^2$ or less, preferably 10 kg/cm$^2$ or less, and especially 5 kg/cm$^2$ or less. A mixing and milling step is then carried out, giving porous (sponge-like) rubber composite particles having a bulk density of preferably not more than 1/2, more preferably from 1/2 to 1/50, and most preferably from 1/5 to 1/20, the theoretical density or specific gravity. If the amount of rubber component in the rubber composite particles is large, it may be transferred to a separate mill, such as a cutting mill, ball mill, Turbomill or jet mill, and there subjected to size reduction.

During mixture of the rubber composite particles, a solvent and a binder may be added to improve adhesion of the rubber with the fibrous substance and the hard particles. The solvent may be any which is capable of swelling and dissolving the rubber. A typical example of a solvent that may be used for this purpose is o-xylene. Illustrative examples of the binder, which may be in either a liquid (solvent) or powder form, include phenol resin, epoxy resin, polyimide resin, polyamide resin and cashew oil. When a solvent is used, drying is necessary. In such cases, it is preferable for milling to be preceded by drying because this facilitates milling and provides better efficiency.

Being endowed with a low bulk density and having a fluffy, porous (sponge-like) nature, the rubber composite particles of the invention, when included in a friction material, are able to ensure that the friction material has the desired porosity and elasticity. In addition, they enhance other properties such as noise performance and resistance to brake fade. The rubber composite particles used in the invention have an average particle size within a range of preferably 50 to 10,000 $\mu$m, more preferably 100 to 5,000 $\mu$m, even more preferably 300 to 5,000 $\mu$m, and most preferably 500 to 2,000 $\mu$m. Rubber composite particles with too small an average size may fail to fully achieve the desired effects of the invention, whereas too large a particle size may result in poor mixture within the friction material composition.

When the rubber composite material particles of the invention are mixed into the friction material composition, addition and mixture of the particles into the composition is preferably carried out with the rubber within the rubber composite particles in an uncrosslinked (unvulcanized) or semi-crosslinked (semi-vulcanized) state and together with a vulcanizing agent (crosslinking agent) such as sulfur. Subsequently molding and postcuring (heat-treating) the friction material composition makes it possible to crosslink (vulcanize) the rubber composite particles, resulting in closer adhesion with the other constituents. The vulcanizing agent is generally added in an amount of from 0.05 to 20% by weight, based on the rubber composite particles, although the addition of a vulcanizing agent (crosslinking agent) may be omitted where use is made of a self-crosslinking (self-vulcanizing) rubber. In some cases, the rubber composite particles may first be crosslinked (vulcanized), then added and into the friction material composition.

The rubber composite particles are added in an amount within a range of preferably 1 to 40% by weight, more preferably 1 to 25% by weight, and most preferably 10 to 25% by weight, of the overall friction material composition. The addition of too small an amount of rubber composite particles may make it impossible to achieve the desired effects of the invention; namely, to enable the uniform dispersion and mixing of the fibrous substance without clumping, to enable the uniform dispersion and mixing of the hard fibrous substance and the hard particles within the friction material without segregation, and to use to full advantage the capabilities of the respective ingredients. On the other hand, too large an amount may result in an excessive proportion of organic substances in the friction material, resulting in decreased resistance to brake fade; that is, inferior braking performance at high brake temperatures.

In the non-asbestos friction material of the invention, by adding particles of a rubber composite composed of rubber and a fibrous substance or of rubber, a fibrous material and hard particles to a friction material composition, fibrous substances and hard particles which have hitherto been difficult to disperse and admix, especially hard particles and hard fibrous substances having a high abrasiveness, can be uniformly mixed and dispersed into the friction material, thereby making it possible to use to the fullest advantage the capabilities of each of these constituents.

As explained above, the non-asbestos friction material of the invention is made by molding and curing a friction material composition which includes a fibrous base, a binder, a filler, and the above-described rubber composite particles. No particular limitation is imposed on the constituents other than the rubber composite particles, although a fibrous base (A), a binder (B), and a filler (C) such as are used in conventional friction materials may be employed The fibrous base serving as component (A) may be, for example, any inorganic or organic fiber commonly used in friction materials, other than asbestos. Illustrative examples include inorganic fibers such as metal fibers (e.g., iron, copper, brass, bronze, aluminum), ceramic fibers, potassium titanate fibers, glass fibers, carbon fibers, rock wool, wollastonite, sepiolite, attapulgite and artificial mineral fibers; and organic fibers such as aramid fibers, polyimide fibers, polyamide fibers, phenolic fibers, cellulose and acrylic fibers. Any one or combinations of two or more thereof may be used.

The fibrous base serving as component (A) may be in the form of staple fibers or a powder. The amount of addition is preferably within a range of 5 to 89% by weight, and especially 20 to 70% by weight, based on the overall friction material composition.

The binder serving as component (B) may be a known binder commonly used in friction materials. Illustrative examples include phenolic resins, melamine resins, epoxy resins, various rubber-modified phenolic resins, and NBR. Any one of these or combinations of two or more thereof may be used.

The amount of binder (B) added is within a range of preferably 5 to 50% by weight, and especially 10 to 25% by weight, based on the overall friction material composition.

The filler serving as component (C) may be any organic or inorganic filler which is known to be used in ordinary frictional materials. Illustrative examples include molybdenum disulfide, antimony trisulfide, calcium carbonate, barium sulfate, magnesium oxide, cashew dust, graphite, calcium hydroxide, calcium fluoride, talc, molybdenum trioxide, antimony trioxide, zirconium silicate, iron oxide, mica, iron sulfide, zirconium oxide, metal powders, quartz, silicon dioxide, rubber powder, alumina, chromium oxide and vermiculite. Any one or combinations of two or more of these may be used.

The amount of filler (C) added is within a range of preferably 5 to 60% by weight, and especially 10 to 40% by weight, based on the overall friction material composition.

The method of making the non-asbestos friction material of the invention involves first uniformly blending components (A), (B) and (C) and the rubber composite particles in a suitable mixer such as a Henschel mixer, Loedige mixer or Eirich mixer so as to give a molding powder, and preforming the powder in a mold. The preform is then molded at a temperature of 130 to 200° C. and a pressure of 100 to 1,000 kg/cm$^2$ for a period of 2 to 10 minutes.

The resulting molded article is postcured by heat-treating at 140 to 250° C. for 2 to 48 hours, then spray-painted, baked and polished, giving the finished article.

In the case of automotive disk pads, for example, production may be carried out by placing the preform on an iron or aluminum plate that has been pre-washed, surface-treated and coated with an adhesive, then shaping the preform in this state within a mold, and subsequently heat-treating, spray-painting, baking and polishing. This gives a finished disk pad.

The non-asbestos friction materials of the invention are highly suitable for a variety of applications, including brake linings, clutch facings, disk pads, paper clutch facings and brake shoes in automobiles, large trucks, railroad cars and various types of industrial equipment.

EXAMPLES

Examples and comparative examples are given below by way of illustration, and are not intended to limit the invention.

Examples and Comparative Examples

Rubber composite materials of the compositions shown in Table 1 were mixed together at 60° C. and under an applied pressure of 70 kg/cm$^2$ for 10 minutes, following which the pressure was released to 1 kg/cm$^2$. The resulting mixtures were then blended and milled to produce rubber composite particles A to K having an average particle size of 500 μm and a bulk density which is 1/10 the theoretical density or specific gravity. The theoretical density was determined by placing 1,000 cm$^3$ of a mixture in a volumetric container and measuring the weight. Measurement was carried out five times, and the theoretical density in each case was taken as the average of these values.

The friction material compositions shown in Tables 2 and 3 were formulated, then uniformly blended in a Loedige mixer and preformed in a pressure mold under a pressure of 100 kg/cm$^2$ for 10 minutes. Each preform was molded for the desired length of time at a temperature and pressure of 160° C. and 250 kg/cm$^2$, then postcured by 5 hours of heat treatment at 200° C., yielding automotive brake pads in each of Examples 1 to 11 and Comparative Examples 1 to 3.

The brake pads obtained in the examples were subjected to wear tests, heat resistance tests, counter surface attack tests, noise tests and high-speed braking vibration tests by the methods described below, based on the vehicle specifications for a passenger car having an engine displacement of 1,800 cc. The results are shown in Tables 2 and 3.

(1) Wear Test (According to JASO C406-87)

Test conditions were initial braking speed, 50 km/h; braking deceleration, 0.15 g; number of braking cycles, 1,000; brake temperature before braking, 150° C. The brake pad wear ratio was rated as follows.

Good: less than 1%

Fair: 1 to 2%

Poor: more than 2%

(2) Heat-Resistance Test (JASO C406-87)

Test conditions were initial braking speed, 100 km/h; braking deceleration, 0.45 g; number of braking cycles, 15; brake temperature before braking, 150° C. The minimum friction coefficient was rated as follows:

Good: more than 0.25

Fair: 0.20 to 0.25

Poor: less than 0.20

(3) Counter Surface Attack Test (JASO C406-87)

Test conditions were initial braking speed, 50 km/h; braking deceleration, 0.15 g; number of braking cycles, 1,000; brake temperature before braking, 150° C. The degree of wear on the rotor serving as the counter surface was rated as follows.

Good: Slight wear (less than 100 μm)

Fair: Moderate wear (100 to 300 μm)

Poor: Considerable wear (more than 300 μm)

(4) Noise Test (JASO C402-88)

The degree of noise and the frequency of noise generation were rated as follows in a road vehicle test.

Good: No noise

Fair: Slight noise

Poor: Moderate noise (5) High-Speed Braking Vibration Test (JASO C402-88)

Test conditions in a road vehicle test were initial braking speed, 200 km/h; braking deceleration, 0.3 g.

Good: Slight vibration

Fair: Moderate vibration

Poor: Considerable vibration

TABLE 1

| | Rubber composite particles | | | | | | | | | | |
|---|---|---|---|---|---|---|---|---|---|---|---|
| | A | B | C | D | E | F | G | H | I | J | K |
| Phenolic resin | | | | | | | | | | 5 | |
| Graphite | | | | 6 | 8 | | | | | 2 | 5 |
| Mica | | | | | | | 4 | | | | |
| Vermiculite | | | | | | | | | | | 8 |
| Ceramic fibers | 5 | | | 4 | | | 3 | | | | 4 |
| Rock wool | | | | | | 2.5 | | | 5 | | |
| Steel fibers | | 9 | | | 10 | | 3 | | | | |
| Copper fibers | 10 | | | | | | | | 4 | | |
| Aramid fibers | | 2 | | | 2 | | 2 | 2 | | 2 | |
| Carbon fibers | | | | | | | | 1 | | | |
| Potassium titanate fibers | | | 10 | | | | | | 5 | | |
| Calcium carbonate whiskers | | | | | | | | | | | 4 |
| Silicon carbide | | | 2 | | | | | | | | |
| Zirconium silicate | | | 3 | 5 | | | | | | 5 | |
| Black iron oxide | | | | | | 0.5 | | | | | |
| Sulfur | | | | | | 0.15 | 1 | 1 | | 0.7 | 1.2 |
| NBR | | | 2 | 2 | | | | | 1.5 | | |
| Acrylic rubber | | | | | | | | | 0.5 | | |
| Silicone rubber | 2 | | | 3 | | | | | | 0.5 | |
| Chlorobutyl rubber | | | | | | 2 | | 2 | | 1.5 | |
| SBR | | | | | 2 | | 1 | | | | 2 |
| Total rubber components (pbw) | 2 | 2 | 2 | 3 | 2 | 2 | 1 | 2 | 2 | 2 | 2 |
| Total (pbw) | 17 | 13 | 17 | 18 | 14 | 13.2 | 10 | 6 | 20 | 16.7 | 24.2 |

TABLE 2

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Phenolic resin | 10 | 11.5 | 10 | 11.5 | 10 | 11.5 | 11.5 | 11.5 | 11.5 | 10 | 10 |
| Cashew dust | 5.5 | 2 | 4 | 2 | 5.5 | 6 | 8 | 8 | 2 | 5.5 | 5.5 |
| Barium sulfate | 18 | 35 | 20 | 35 | 18 | 28.5 | 35 | 35 | 35 | 18 | 18 |
| Calcium carbonate | 5 | | | | 5 | | | | | 5 | 5 |
| Slaked lime | 2 | 2 | 2 | 2 | 2 | 2 | 2 | 2 | 2 | 2 | 2 |
| Graphite | 5.5 | 15 | 7 | 15 | 5.5 | 5 | 5 | 15 | 15 | 5.5 | 5.5 |
| Mica | 10 | 12.5 | | 12.5 | 10 | 10 | | 14.5 | 12.5 | 10 | 10 |
| Vermiculite | | | 12 | | | | | | | | |
| Ceramic fibers | | | | | | | | | | | |
| Steel fibers | | 8 | | 8 | | | | | 8 | | |
| Copper fibers | 16 | | 14 | | 16 | | | | | 16 | 16 |
| Aramid fibers | | 3 | 1 | 3 | | 3 | 3 | 3 | 3 | | |
| Potassium titanate fibers | 18 | | 19 | | 18 | 23 | 24.5 | | | 18 | 18 |
| Sulfur | | | | | | | | | | | |
| Zirconium silicate | | | | | | | | | | | |
| Reclaimed tire dust | | 1 | 1 | 1 | | 1 | 1 | 1 | 1 | | |
| SBR | | | | | | | | | | | |
| Silicone rubber | | | | | | | | | | | |
| Rubber composite particles | A 10 | B 10 | C 10 | D 10 | E 10 | F 10 | G 10 | H 10 | I 10 | J 10 | K 10 |
| Total (wt %) | 100 | 100 | 100 | 100 | 100 | 100 | 100 | 100 | 100 | 100 | 100 |
| Wear test | good | good | good | good | good | good | good | good | good | good | good |
| Heat resistance test | good | good | good | good | good | good | good | good | good | good | good |
| Noise test | good | good | good | good | good | good | good | good | good | good | good |
| High-speed braking vibration test | good | good | good | good | good | good | good | good | good | good | good |
| Counter surface attack test | good | good | good | good | good | good | good | good | good | good | good |

TABLE 3

| | Comparative Examples | | |
|---|---|---|---|
| | 1 | 2 | 3 |
| Phenolic resin | 10 | 10 | 10 |
| Cashew dust | 5.5 | 5.5 | 8.5 |
| Barium sulfate | 18 | 18 | 18 |
| Calcium carbonate | 5 | 5 | 5 |
| Slaked lime | 2 | 2 | 2 |
| Graphite | 5.5 | 5.5 | 6.7 |

TABLE 3-continued

|  | Comparative Examples | | |
|---|---|---|---|
|  | 1 | 2 | 3 |
| Mica | 10 | 10 | 10 |
| Vermiculite |  |  |  |
| Ceramic fibers | 2.9 |  |  |
| Steel fibers |  | 7.2 |  |
| Copper fibers | 21.9 | 16 | 16 |
| Aramid fibers |  | 1.4 | 1.2 |
| Potassium titanate fibers | 18 | 18 | 18 |
| Sulfur |  |  | 0.4 |
| Zirconium silicate |  |  | 3 |
| Reclaimed tire dust |  |  |  |
| SBR |  | 1.4 | 0.9 |
| Silicone rubber | 1.2 |  | 0.3 |
| Rubber composite particles | — | — | — |
| Total (wt %) | 100 | 100 | 100 |
| Wear test | poor | poor | poor |
| Heat resistance test | poor | poor | poor |
| Noise test | poor | poor | poor |
| High-speed braking vibration test | poor | poor | poor |
| Counter surface attack test | poor | poor | poor |

As is apparent from the results in Tables 2 and 3, the friction materials in Comparative Examples 1 to 3, which were produced by merely mixing together the respective prior-art constituents, yielded results for the wear test, heat resistance test, noise test, high-velocity braking vibration test and counter surface attack test that were inferior in each case to those obtained in the examples according to the invention.

By contrast, in each of Examples 1 to 11 according to the invention, wherein particles of a rubber composite composed primarily of rubber and a fibrous substance or of rubber, a fibrous substance and hard particles were included, good results were obtained in the wear test, heat resistance test, noise test, high-velocity braking vibration test and counter surface attack test.

The invention permits the fibrous substance to be uniformly dispersed and mixed in the non-asbestos friction materials without forming clumps, or masses, of the starting materials, and the hard fibrous substance and hard particles to be uniformly dispersed and mixed without segregation within the friction material. The friction materials are able to use to full advantage the capabilities of each constituent and thus are of high quality, as attested by their excellent noise performance, resistance to brake fade, wear resistance, resistance to counter surface attack, and high-speed braking vibration characteristics.

Japanese Patent Application No. 11-216258 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material comprising a molded and cured composition that includes (A) a fibrous base, (B) a binder, (C) a filler, and (D) particles of a rubber composite composed primarily of at least one fibrous substance and rubber.

2. The non-asbestos friction material of claim 1 wherein the fibrous substance is a hard fibrous substance having a Mohs hardness of at least 4.

3. The non-asbestos friction material of claim 1 wherein the fibrous substance is a soft fibrous substance having a Mohs hardness of less than 4.

4. The non-asbestos friction material of claim 1 wherein the fibrous substance is a combination of at least one hard fibrous substance and at least one soft fibrous substance.

5. The non-asbestos friction material of claim 1 wherein the rubber composite particles further contain a crosslinking agent.

6. The non-asbestos friction material of claim 1 wherein the rubber composite particles have an average size of 50 to 10,000 $\mu$m.

7. The non-asbestos friction material of claim 1, wherein the rubber composite particles are porous and have a bulk density after mixing and size reduction of at most one-half the theoretical density.

8. The non-asbestos friction material of claim 1, wherein the rubber composite particles have been produced by:

mixing a mixture of at least one fibrous substance and rubber at 20 to 200° C., under a pressure of 1 to 100 kg/cm$^2$ and for a period of 1 to 30 minutes;

then releasing the pressure to 20 kg/cm$^2$ or less, such that the pressure after mixing is lower than the mixing pressure; and mixing and milling.

9. The non-asbestos friction material of claim 1, wherein the rubber composite particles have been produced by mixing a mixture of at least one fibrous substance and rubber at 20 to 200° C. under applied pressure for a period of 1 to 30 minutes and then releasing the pressure and mixing and milling.

10. A non-asbestos friction material comprising a molded and cured composition that includes (A) a fibrous base, (B) a binder, (C) a filler, and (D) particles of a rubber composite composed primarily of at least one type of fibrous substance, at least one type of hard particle and rubber.

11. The non-asbestos friction material of claim 10 wherein the fibrous substance is a hard fibrous substance having a Mohs hardness of at least 4.

12. The non-asbestos friction material of claim 10 wherein the fibrous substance is a soft fibrous substance having a Mohs hardness of less than 4.

13. The non-asbestos friction material of claim 10 wherein the fibrous substance is a combination of at least one hard fibrous substance and at least one soft fibrous substance.

14. The non-asbestos friction material of claim 10 wherein the hard particles have a Mohs hardness of at least 4.

15. The non-asbestos friction material of claim 10 wherein the rubber composite particles further contain a crosslinking agent.

16. The non-asbestos friction material of claim 10 wherein the rubber composite particles have an average size of 50 to 10,000 $\mu$m.

17. The non-asbestos friction material of claim 10, wherein the rubber composite particles are porous and have a bulk density after mixing and size reduction of at most one-half the theoretical density.

18. The non-asbestos friction material of claim 10, wherein the rubber composite particles have been produced by:

mixing a mixture of at least one fibrous substance at 20 to 200° C., under a pressure of 1 to 100 kg/cm$^2$ and for a period of 1 to 30 minutes;

then releasing the pressure to 20 kg/cm² or less, such that the pressure after mixing is lower than the mixing pressure; and mixing and milling.

19. The non-asbestos friction material of claim 10, wherein the rubber composite particles have been produced by mixing a mixture of at least one fibrous substance, at least one type of hard particle, and rubber at 20 to 200° C. under applied pressure for a period of 1 to 30 minutes and then releasing the pressure and mixing and milling.

* * * * *